US009216530B2

(12) United States Patent
Vaccaro

(10) Patent No.: US 9,216,530 B2
(45) Date of Patent: Dec. 22, 2015

(54) CONNECTOR COVER

(71) Applicant: Andrew LLC, Hickory, NC (US)

(72) Inventor: Ronald Alan Vaccaro, Shorewood, IL (US)

(73) Assignee: CommScope Technologies LLC, Hickory, NC (US)

(*) Notice: Subject to any disclaimer, the term of this patent is extended or adjusted under 35 U.S.C. 154(b) by 466 days.

(21) Appl. No.: 13/646,952

(22) Filed: Oct. 8, 2012

(65) Prior Publication Data

US 2014/0097022 A1     Apr. 10, 2014

(51) Int. Cl.
*H02G 15/013* (2006.01)
*B29C 45/14* (2006.01)
*B29C 45/26* (2006.01)
B29K 83/00 (2006.01)
B29L 31/26 (2006.01)
B29L 31/36 (2006.01)
B29K 105/04 (2006.01)
B29K 21/00 (2006.01)

(52) U.S. Cl.
CPC ............ *B29C 45/261* (2013.01); *H02G 15/013* (2013.01); *B29K 2021/003* (2013.01); *B29K 2083/005* (2013.01); *B29K 2105/046* (2013.01); *B29K 2995/0046* (2013.01); *B29L 2031/26* (2013.01); *B29L 2031/36* (2013.01)

(58) Field of Classification Search
CPC ............... H02G 15/013; B29C 45/261; B29K 2083/005; B29K 2995/0046; B29K 2105/046; B29K 2021/003; B29L 2031/26; B29L 2031/36

USPC ......... 174/75 C, 85, 77 R, 74 R, 75 R, 138 F; 439/521, 281, 271, 275, 345, 367, 368, 439/369, 370, 277, 279, 278
See application file for complete search history.

(56) References Cited

U.S. PATENT DOCUMENTS

| 2,946,839 | A | 2/1959 | Horning |
| 3,390,375 | A | 6/1968 | Salmonson |
| 3,528,051 | A | 9/1970 | Toedtman et al. |
| 3,753,192 | A | 8/1973 | Urani |

(Continued)

FOREIGN PATENT DOCUMENTS

| JP | 4482668 | 6/2010 |
| KR | 1020100010333 | 2/2010 |

OTHER PUBLICATIONS

Jai Heon Jeong, International Search Report for application PCT/US2014/040457 (commonly owned but not related), Sep. 22, 2014, Korean Intellectual Property Office, Daejeon Metropolitan City.

*Primary Examiner* — Hoa C Nguyen
*Assistant Examiner* — Amol Patel
(74) *Attorney, Agent, or Firm* — Babcock IP, PLLC

(57) ABSTRACT

A seal for a cable and connector interconnection includes a unitary elastic primary body with a primary bore therethrough. The primary bore is provided with a primary cable outer diameter seal portion at a cable end, the cable outer diameter seal portion adjacent a primary connector cavity portion, the primary connector cavity portion adjacent a coupling nut cavity portion, and the coupling nut cavity portion adjacent a connector neck seal portion at a connector end. The coupling nut cavity portion is longitudinally aligned with a coupling nut of the connector and is provided with a greater inner diameter than the cable outer diameter seal portion and the connector neck seal portion.

19 Claims, 3 Drawing Sheets

(56) References Cited

U.S. PATENT DOCUMENTS

| | | | |
|---|---|---|---|
| 3,861,777 | A | 1/1975 | Clark |
| 4,084,066 | A | 4/1978 | Gillemot |
| 4,173,385 | A | 11/1979 | Fenn et al. |
| 4,224,464 | A | 9/1980 | Bunnell et al. |
| 4,283,597 | A | 8/1981 | Cooper, Jr. |
| 4,325,600 | A | 4/1982 | Nestor |
| 4,593,962 | A | 6/1986 | Knorreck et al. |
| 4,822,293 | A | 4/1989 | Robson |
| 4,880,676 | A | 11/1989 | Puigcerver et al. |
| 5,132,495 | A | 7/1992 | Ewing et al. |
| 5,502,280 | A | 3/1996 | Rocci et al. |
| 5,631,443 | A | 5/1997 | Scrimpshire et al. |
| 5,816,853 | A | 10/1998 | Buekers et al. |
| 5,857,865 | A | 1/1999 | Shimirak et al. |
| 5,886,294 | A | 3/1999 | Scrimpshire et al. |
| 6,273,733 | B1 | 8/2001 | Uchiyama |
| 6,429,373 | B1 | 8/2002 | Scrimpshire et al. |
| 6,482,017 | B1 | 11/2002 | Van Doorn |
| 6,929,265 | B2 | 8/2005 | Holland et al. |
| 6,942,520 | B2 | 9/2005 | Barlian et al. |
| 6,955,558 | B1 | 10/2005 | Low et al. |
| 7,179,100 | B2 | 2/2007 | Montena |
| 7,407,412 | B2 | 8/2008 | Khemakhem |
| 7,453,042 | B2 | 11/2008 | Low et al. |
| 7,674,121 | B2 | 3/2010 | Khemakhem |
| 7,767,908 | B2 | 8/2010 | Sylvan |
| 7,838,775 | B2 | 11/2010 | Montena |
| 7,909,635 | B2 | 3/2011 | Hughes et al. |
| 8,152,547 | B2 | 4/2012 | Hughes |
| 2003/0024717 | A1 | 2/2003 | Knighten et al. |
| 2004/0245730 | A1* | 12/2004 | Holland et al. ............... 277/602 |
| 2006/0286862 | A1 | 12/2006 | Lubinsky et al. |
| 2010/0248533 | A1* | 9/2010 | Montena ...................... 439/521 |
| 2011/0003498 | A1* | 1/2011 | Amidon ........................ 439/278 |
| 2015/0017827 | A1* | 1/2015 | Vaccaro ........................ 439/275 |

\* cited by examiner

CONNECTOR COVER

BACKGROUND

1. Field of the Invention

The invention relates to a device for environmentally sealing and securing the interconnection between cables and/or apparatus, for example between two connector terminated cables or the feed and/or control cables interconnected with an antenna.

2. Description of Related Art

Electrical interconnections are subject to degradation from environmental factors such as moisture, vibration and repeated expansion and contraction from daily temperature changes.

Environmental seals, such as outer sealing enclosures that surround an electrical interconnection, have been used, for example, to surround a cable end connector to cable end connector interconnection.

The prior enclosures typically apply rigid clamshell configurations which, once closed, may be difficult to open, especially when installed in exposed locations such as atop radio towers. Gaskets may be applied at the enclosure ends and/or along a sealing perimeter of the shell. Gel seals are typically not re-usable and/or have only a limited number of re-uses before they must be replaced.

Connections to an apparatus, for example an antenna, are typically made to a connector body or other connection assembly mounted to an exterior surface of the antenna. Because the connector body or other connection assembly is typically a bulkhead type, flush against a surface, a cable to cable interconnection sealing assembly that tapers at either end to the same cable diameter is unusable.

Elastic body interconnection seals are also known. For example, U.S. Pat. No. 7,838,775, titled "Cover for Cable Connectors", issued 23 Nov. 2010, discloses a seal of rubber material, with a series of successively larger diameter bore portions from one end to the other, for sealing against a proprietary connector with a neck portion which extends outward farther than the coupling nut of the connector. Thereby, the largest diameter bore portion seals against the enlarged neck portion of the proprietary connector. However, many connectors utilize standardized connection interfaces wherein the coupling nut extends radially outward from the neck portion.

U.S. Pat. No. 7,453,042, titled "Cable and Apparatus Interconnection Close Quarters Environmental Seal", issued 18 Nov. 2008, discloses a seal with a unitary rubber and/or elastomer body cylindrical gasket with a C-shaped outer shell closed by an additional retaining means. The interconnection may be placed into the outer shell and the outer shell then sealed around it, via the retaining means. Such a configuration enables sealing along neck portions of standardized connection interfaces. However, the seal area along the periphery of the C-shaped body is extensive, which may degrade the long term performance of the resulting seal.

Competition within the electrical interface environmental seal industry has focused attention on reliability, re-usability, ease of use, improved high temperature capabilities and overall reductions in manufacturing and installation costs.

Therefore, it is an object of the invention to provide a device that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
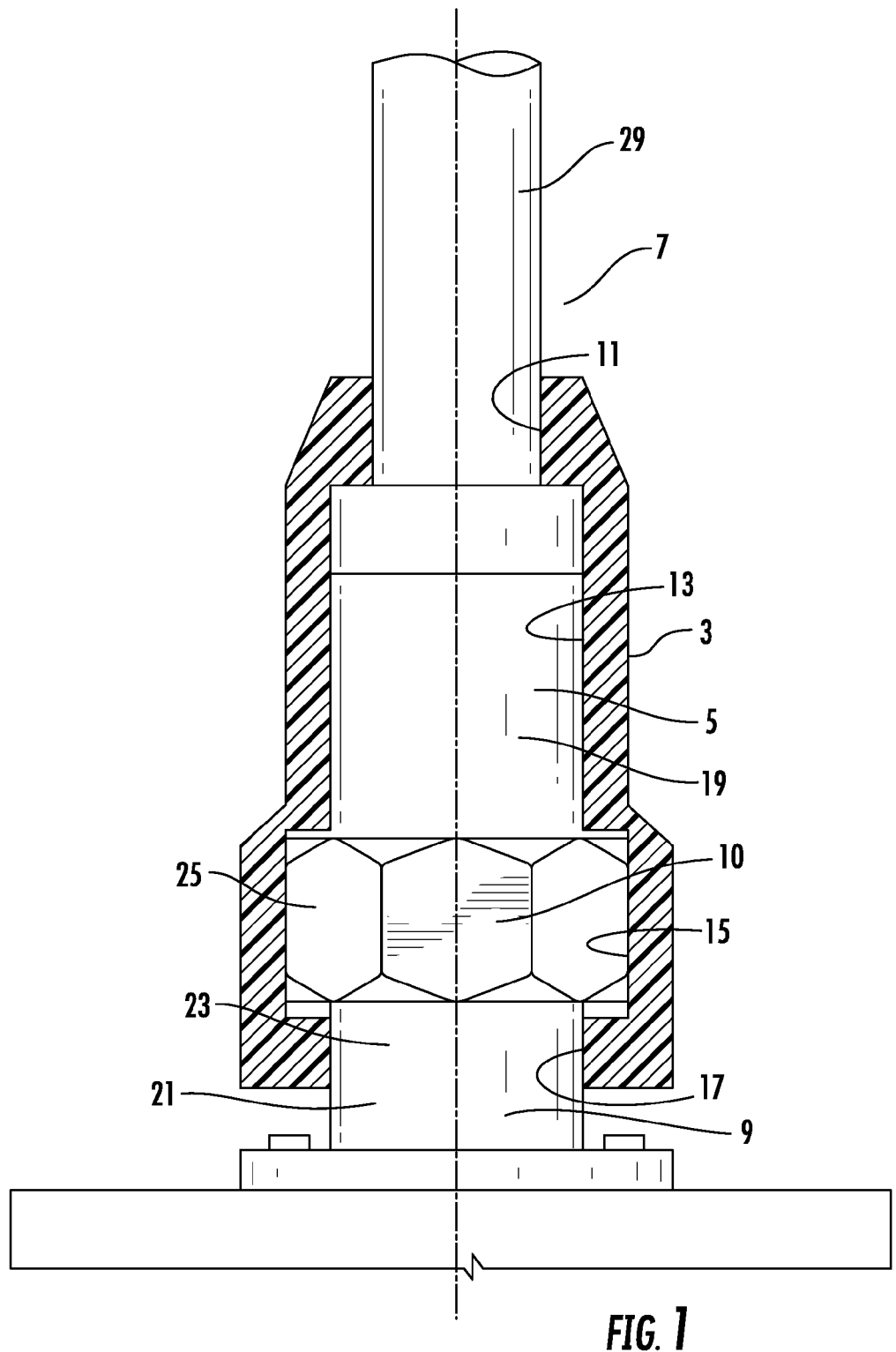
FIG. 1 is a schematic side-section view of an exemplary connector terminated cable to a bulkhead connector interconnection seal.
Figure 2:
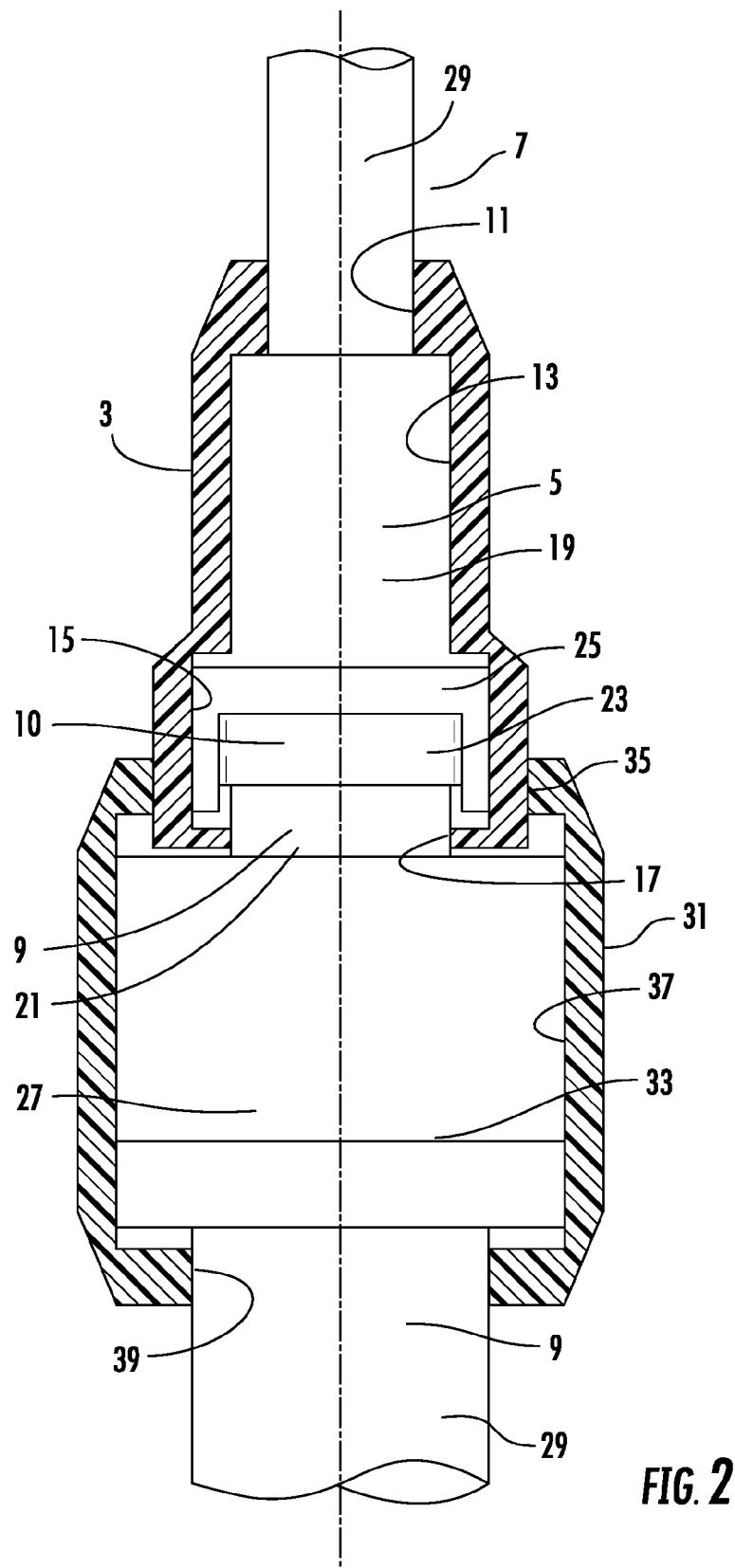
FIG. 2 is a schematic side-section view of the interconnection seal of FIG. 1 applied in concert with a second sealing body to form a connector terminated cable to connector terminated cable interconnection seal.

As shown for example by FIGS. 1 and 2, a seal according to a first embodiment of the invention has a unitary elastic primary body 3 with a primary bore 5 therethrough. Sequenced from a cable end 7 to a connector end 9, the primary bore 5 has: (a) a primary cable outer diameter seal portion 11 at the cable end 7; (b) the cable outer diameter seal portion 11 adjacent a primary connector cavity portion 13; (c) the primary connector cavity portion 13 adjacent a coupling nut cavity portion 15; and (d) the coupling nut cavity portion 15 adjacent a connector neck seal portion 17 at the connector end 9.

One skilled in the art will appreciate that cable end 7 and connector end 9 are provided as position references for both the interconnection and individual elements of the connector and seal portions along a longitudinal axis of the interconnection 10. Therefore, each element identified has both a cable end 7 and a connector end 9, these being the sides of each element closest to the cable end 7 and the connector end 9 of the interconnection 10, along the longitudinal axis of the interconnection 10. Where sealing of an interconnection 10 between two connector terminated cables is described herein below, the cable and connector end 7, 9 positions referenced are with respect to those identified initially with respect to the primary connector 19 (according to FIG. 1).

The connector neck seal portion 17 is configured to seal against the neck portion 21 of the connector interface 23, for example, that a coupling nut 25 of the primary connector 19 is threaded upon. The connector interface 23 may be provided as a bulkhead type connection point, as shown for example in FIG. 1, or as the interconnecting portion of a secondary connector 27 such as the cable terminating connector of another cable 29, as shown for example in FIG. 2. The coupling nut cavity portion 15 is provided with a greater inner diameter than the connector neck seal portion 17. Thereby, the coupling nut cavity portion 15 can surround the coupling nut 25 and the connector neck seal portion 17 can engage and seal against the neck 21 of the selected connector interface 23, without requiring a non-standard connection interface with an increased connector neck diameter.

The primary body 3 may be formed from a unitary portion of material with an elastic characteristic such as injection molded silicone rubber, thermoplastic elastomers, molded closed-cell foam or the like having suitable sealing, environmental resistance and stability characteristics. Thereby, the primary body 3, and similarly the secondary body 31 (when present), has suitable rigidity to maintain the dimensions of the several portions prior to use while also being provided with an elastic property enabling at least the connector neck seal portion 17 to be stretched over the coupling nut 25 of the primary connector 19 during installation of the seal over the interconnection 10, so that the coupling nut cavity portion 15 is longitudinally aligned with the coupling nut 25 of the primary connector 19.

The primary cable outer diameter seal portion 11 and/or connector neck seal portion 17 may be provided with a smooth cylindrical inner sidewall. Thereby, the contact area between the cable outer diameter seal portion 11 and the outer diameter of the cable 29 and/or between the connector neck seal portion 17 and a neck 21 of the connector interface 23 is maximized, so that the seal there between has the largest possible contact area to resist leakage, and any leakage that does occur is not provided with areas within which liquid may pool along the extent of the respective sealing surfaces.

The primary connector cavity portion 13 may be provided with a single inner diameter between the primary cable outer diameter seal portion 11 and the coupling nut cavity portion 15. That is, the coupling nut cavity portion 15 and the primary cable outer diameter seal portion 11 may be provided with an essentially constant outer diameter. Thereby, mold requirements may be simplified and/or separation from the mold during seal manufacture may be enhanced.

Where an interconnection encompassing splice seal is desired between a primary connector 19 and a secondary connector 27 interconnected to form a cable-to-cable splice between connector terminated cable ends, the primary body 3 may be applied in combination with a secondary body 31 configured to enclose the secondary connector 27 and seal against the outer diameter of the primary body 3 and the outer diameter of the other portion of cable 29, for example as shown in FIG. 2.

The secondary body 31 may also be provided as a unitary elastic portion of material with a secondary bore 33 therethrough. The secondary bore 33 may be provided with a primary body outer diameter seal portion 35 at the cable end 7 (with respect to the primary connector 19) wherein the primary body outer diameter seal portion 35 is adjacent a secondary connector cavity portion 37 and the secondary connector cavity portion 37 is adjacent a secondary cable outer diameter seal portion 39 at the connector end 9 (with respect to the primary connector 19). The primary body outer diameter seal portion 35 is dimensioned to seal against an outer diameter of one or both of the coupling nut cavity portion 15 and the connector neck seal portion 17. Thereby the secondary body 31 forms an environmental seal against an outer diameter of the primary body 3.

As described with respect to the primary cable outer diameter seal portion 11 hereinabove, the secondary cable outer diameter seal portion 39 may also be provided with a smooth cylindrical inner sidewall and the primary body outer diameter seal portion 35 and the secondary cable outer diameter seal portion 39 may have an inner diameter less than the secondary connector cavity portion 37.

To install a seal over a cable and connector interconnection, the primary body 3 may be applied over the cable 29 and advanced away from the end of the cable prior to attaching the primary connector 19 thereto. Alternatively, the primary body 3 may be stretched to enable insertion of the primary connector 19 with the cable 29 already attached through the primary bore 5. Once the primary connector 19 is coupled to the desired connection interface 23, such as a bulkhead connector of an antenna (see FIG. 1), the connector neck seal portion 17 may be stretched over the coupling nut 25 of the primary connector 19 to seal against the neck 21 of the connection interface 23. Thereby the interconnection of the cable 29 to the connection interface 23 is environmentally sealed both at the cable 29 to primary connector 19 interconnection and also at the primary connector 3 to connector interface 23 interconnection via a single primary body 3.

Where the desired connection interface 23 is a secondary connector 27 of another cable 29 the primary and secondary connectors 19, 27 may be interconnected and the seal applied as described herein above. The secondary body 31, previously applied to the other cable end either before the secondary connector 27 is attached to the other cable end or the secondary body 31 is stretched to pass the secondary connector 27 with cable attached through the secondary bore 33, is pulled toward the interconnection and over the secondary body 31 so that the primary body outer diameter seal portion 35 seals against the outer diameter of one or both of the coupling nut cavity portion 15 and the connector neck seal portion 17. The portions of the secondary body 31 are dimensioned longitudinally such that once the primary body outer diameter seal portion 35 is sealed against the outer diameter of the primary body 3, the secondary cable outer diameter seal portion 39 seals against the outer diameter of the other cable.

Figure 3:
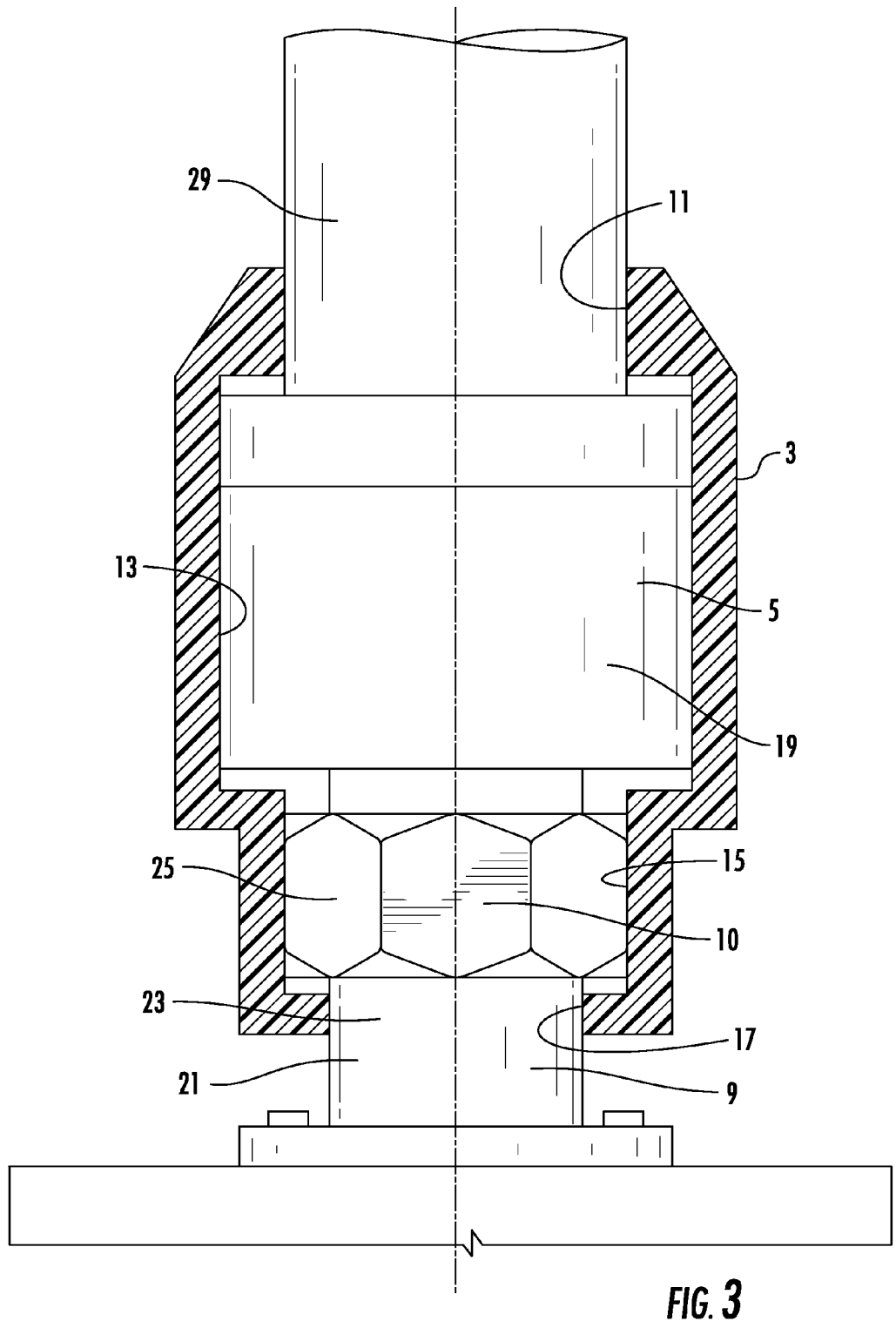
FIG. 3 is a schematic side-section view of an alternative connector terminated cable to a bulkhead connector interconnection seal.

One skilled in the art will appreciate that the relative dimensions of the cable 29 and, for example, primary connector 19 with respect to the terminating connection interface 23 are exemplary, only. Alternatively, a larger cable and corresponding connector may terminate upon a comparatively small connection interface 23, for example as shown in FIG. 3.

The primary and/or secondary bodies 3, 31 may be manufactured, for example by injection molding, from one of a liquid injection molded silicone rubber, liquid silicone rubber, thermoplastic elastomer and molded closed-cell foam. Elastic properties of these materials may enable molding without utilizing cost prohibitive collapsing core mold portions.

From the foregoing, it will be apparent that the seals bring to the art a seal useful, for example, for re-useable sealing of bulkhead and/or splice type interconnections of standard connector interfaces. The resulting seals may further enable significant manufacturing and/or installation efficiencies.

| Table of Parts | |
|---|---|
| 3 | primary body |
| 5 | primary bore |
| 7 | cable end |
| 9 | connector end |
| 10 | interconnection |
| 11 | primary cable outer diameter seal portion |
| 13 | primary connector cavity portion |
| 15 | coupling nut cavity portion |
| 17 | connector neck seal portion |
| 19 | primary connector |
| 21 | neck |
| 23 | connector interface |
| 25 | coupling nut |
| 27 | secondary connector |
| 29 | cable |
| 31 | secondary body |
| 33 | secondary bore |
| 35 | primary body outer diameter seal portion |
| 37 | secondary connector cavity portion |
| 39 | secondary cable outer diameter seal portion |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A seal for a cable and connector interconnection, comprising:
   a unitary elastic primary body with a primary bore therethrough;
   the primary bore provided with a primary cable outer diameter seal portion at a cable end, the cable outer diameter seal portion adjacent a primary connector cavity portion, the primary connector cavity portion adjacent a coupling nut cavity portion, and the coupling nut cavity portion adjacent a connector neck seal portion at a connector end;
   the coupling nut cavity portion longitudinally aligned with a coupling nut of the connector and provided with a greater inner diameter than the connector neck seal portion;
   the primary body is self supporting, maintaining a dimension of the primary cable outer diameter seal portion, the primary connector cavity portion and the coupling nut cavity portion prior to installation.

2. The seal of claim 1, wherein the cable outer diameter seal portion is provided with a smooth cylindrical inner sidewall.

3. The seal of claim 1, wherein the coupling nut cavity portion is provided with a greater inner diameter than the cable outer diameter seal portion.

4. The seal of claim 1, wherein the connector cavity portion is provided with a single inner diameter between the cable outer diameter seal portion and the coupling nut cavity portion.

5. The seal of claim 1, wherein the connector neck seal portion is provided with a smooth cylindrical inner sidewall.

6. The seal of claim 1, wherein the coupling nut cavity portion and the cable outer diameter seal portion are provided with an essentially constant outer diameter.

7. The seal of claim 1, further including a unitary elastic secondary body with a secondary bore therethrough;
   the secondary bore provided with a primary body outer diameter seal portion at the cable end; the primary body outer diameter seal portion adjacent a secondary connector cavity portion, the secondary connector cavity portion adjacent a secondary cable outer diameter seal portion at the connector end;
   the primary body outer diameter seal portion dimensioned to seal against an outer diameter of one or both of the coupling nut cavity portion and the connector neck seal portion.

8. The seal of claim 7, wherein the secondary cable outer diameter seal portion is provided with a smooth cylindrical inner sidewall.

9. The seal of claim 7, wherein the primary body outer diameter seal portion and the secondary cable outer diameter seal portion have an inner diameter less than the secondary connector cavity portion.

10. The seal of claim 7, wherein the secondary body is self supporting, maintaining a dimension of the secondary cable outer diameter seal portion, the secondary connector cavity portion and the primary body outer diameter seal portion prior to installation.

11. A method for manufacturing a seal for a cable and connector interconnection, comprising the steps of:
   forming a unitary elastic primary body with a primary bore therethrough;
   the primary bore provided with a primary cable outer diameter seal portion at a cable end, the cable outer diameter seal portion adjacent a primary connector cavity portion, the primary connector cavity portion adjacent a coupling nut cavity portion, and the coupling nut cavity portion adjacent a connector neck seal portion at a connector end;
   the coupling nut cavity portion longitudinally aligned with a coupling nut of the connector and provided with a greater inner diameter than the connector neck seal portion;
   the primary body is self supporting, maintaining a dimension of the primary cable outer diameter seal portion, the primary connector cavity portion and the coupling nut cavity portion prior to installation.

12. The method claim 11, wherein the coupling nut cavity portion is provided with a greater inner diameter than the cable outer diameter seal portion.

13. The method of claim 11, wherein the primary body is formed from one of a injection molded silicone rubber thermoplastic elastomer and molded closed-cell foam.

14. The method of claim 11, further including the step of forming a unitary elastic secondary body with a secondary bore therethrough;
   the secondary bore provided with a primary body outer diameter seal portion at the cable end; the primary body outer diameter seal portion adjacent a secondary connector cavity portion, the secondary connector cavity portion adjacent a secondary cable outer diameter seal portion at the connector end;
   the primary body outer diameter seal portion dimensioned to seal against an outer diameter of one or both of the coupling nut cavity portion and the connector neck seal portion.

15. The method of claim 14, wherein the secondary body is formed from one of a injection molded silicone rubber thermoplastic elastomer and molded closed-cell foam.

16. A method for sealing an interconnection between a cable terminated by a primary connector and a secondary connector, comprising the steps of:
   providing a unitary elastic primary body with a primary bore therethrough;
   the primary bore provided with a primary cable outer diameter seal portion at a cable end, the cable outer diameter seal portion adjacent a primary connector cavity portion, the primary connector cavity portion adjacent a coupling nut cavity portion, and the coupling nut cavity portion adjacent a connector neck seal portion at a connector end;
   inserting the cable and primary connector through the primary bore and interconnecting the primary and secondary connector;
   longitudinally aligning the coupling nut cavity portion over a coupling nut of the primary connector whereby the cable outer diameter seal portion seals against an outer diameter of the cable and the connector neck seal portion extends inward from the diameter of the coupling nut and seals against a neck of the second connector;
   the primary body is self supporting, maintaining a dimension of the primary cable outer diameter seal portion, the primary connector cavity portion and the coupling nut cavity portion prior to installation.

17. The method of claim 16, further including the step of providing a unitary elastic secondary body with a secondary bore therethrough;

the secondary bore provided with a primary body outer diameter seal portion at the cable end; the primary body outer diameter seal portion adjacent a secondary connector cavity portion, the secondary connector cavity portion adjacent a secondary cable outer diameter seal portion at the connector end;

inserting a secondary cable through the secondary bore;

longitudinally aligning the secondary body so that the primary body outer diameter seal portion seals against an outer diameter of one or both of the coupling nut cavity portion and the connector neck seal portion, and the secondary connector cavity portion seals against an outer diameter of the secondary cable.

18. The method of claim 16, wherein the primary body is formed from one of a liquid injection molded silicone rubber, liquid silicone rubber, thermoplastic elastomer and molded closed-cell foam.

19. The method of claim 17, wherein the secondary body is formed from one of a injection molded silicone rubber thermoplastic elastomer and molded closed-cell foam.

\* \* \* \* \*